H. WILLIAMS.
Grain-Drill.
No. 49,818.
2 Sheets—Sheet 1.
Patented Sept. 5, 1865.
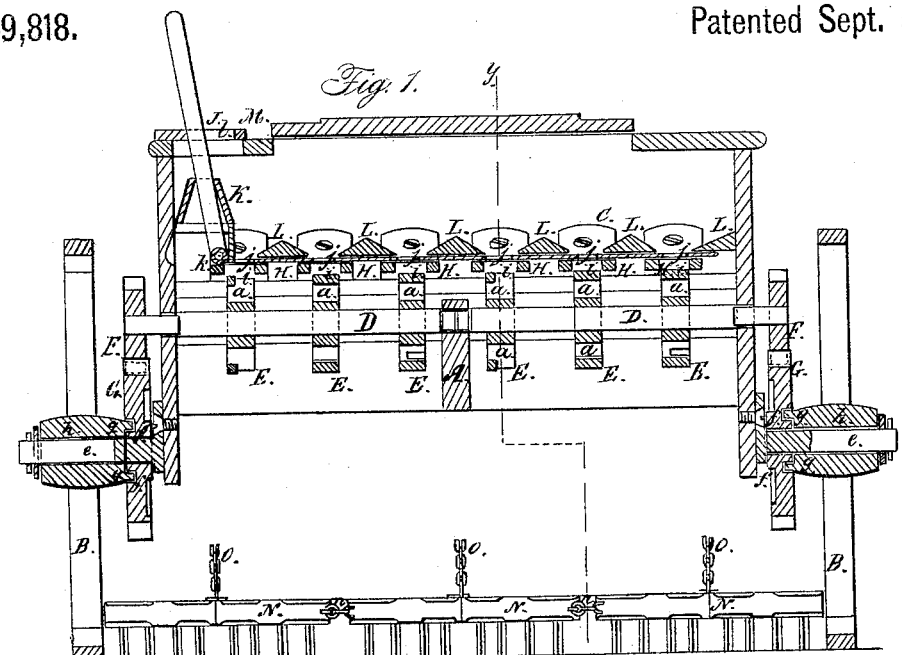
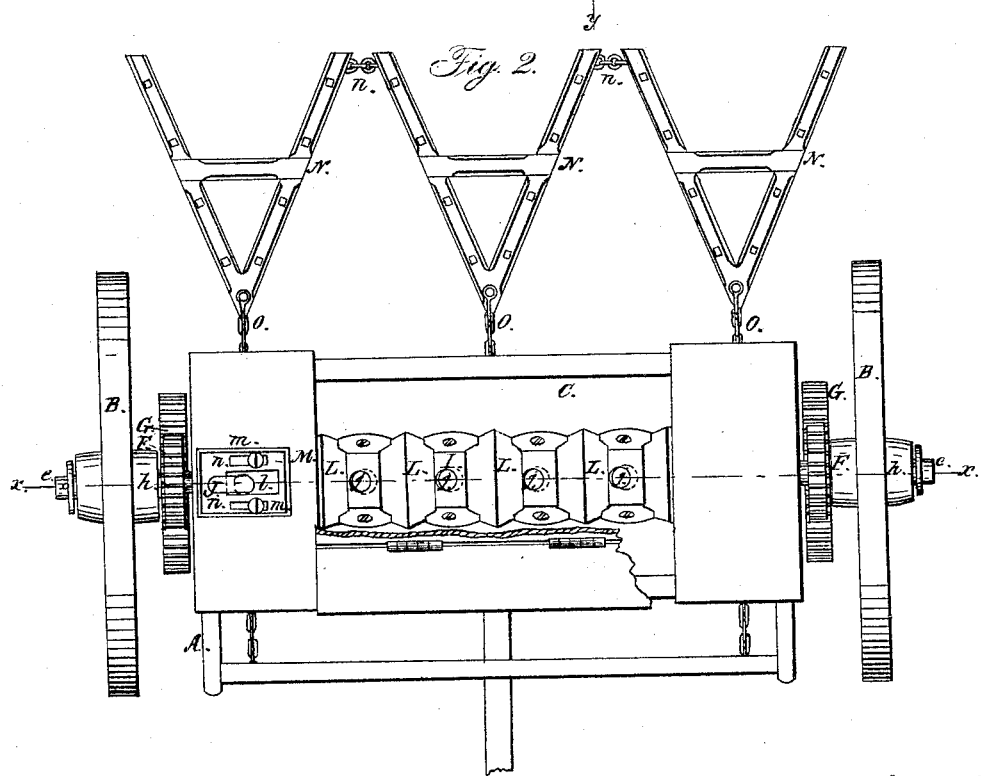
Witnesses:
Theo Tusch
Henry Bowie
Inventor:
Henry Williams
per Munn & Co.
Attorneys H. WILLIAMS.
Grain Drill
No. 49,818.
2 Sheets—Sheet 2.
Patented Sept. 5, 1865.
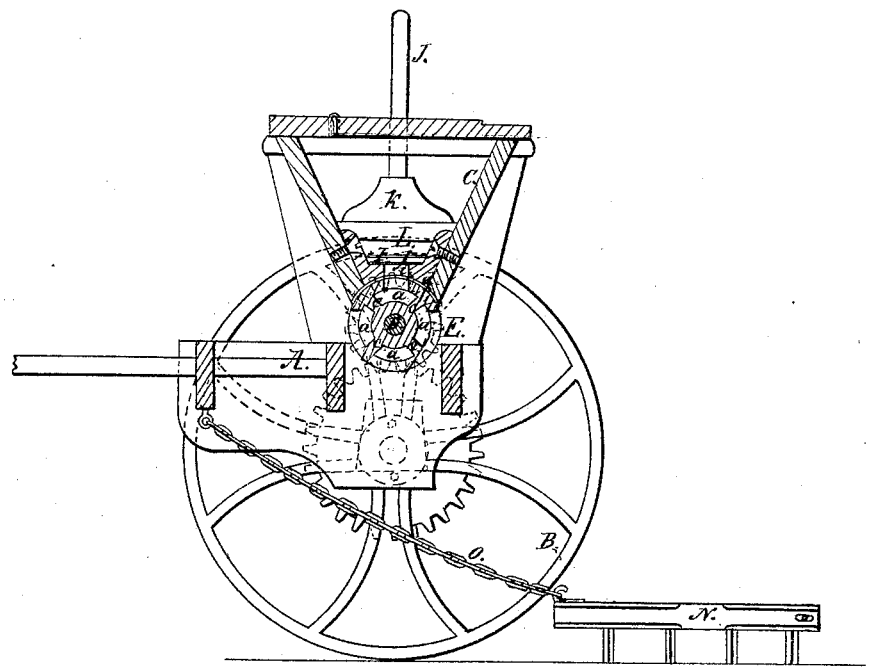
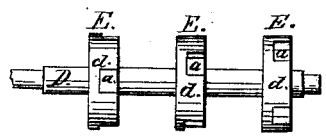
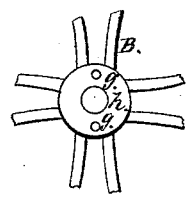
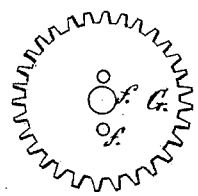
Witnesses:
Theo. Tusch.
Henry Morris.
Inventor:
Henry Williams.
per Munn & Co.
Attorneys.

UNITED STATES PATENT OFFICE.

HENRY WILLIAMS, OF KENOSHA, WISCONSIN.

IMPROVEMENT IN SEEDING-MACHINES.

Specification forming part of Letters Patent No. 49,818, dated September 5, 1865.

*To all whom it may concern:*

Be it known that I, HENRY WILLIAMS, of Kenosha, in the county of Kenosha and State of Wisconsin, have invented a new and Improved Seeding-Machine; and I do hereby declare that the following is a full, clear, and exact description thereof, which will enable others skilled in the art to make and use the same, reference being had to the accompanying drawings, forming part of this specification, in which—

Figure 1, Sheet No. 1, is a longitudinal vertical section of my invention, taken in the line $x\,x$, Fig. 2; Fig. 2, a plan or top view of the same; Fig. 3, Sheet No. 2, a side sectional view of the same, taken in the line $y\,y$, Fig. 1; Fig. 4, a detached view of one of the distributing-shafts with the distributers placed upon it; Fig. 5, a view of the inner end of the hub of one of the wheels on which the machine is mounted; Fig. 6, a side view of a cog-wheel, which is attached to the hub aforesaid.

Similar letters of reference indicate like parts.

This invention relates to a new and improved machine for sowing seed broadcast; and it consists in a certain construction and arrangement of parts, herein fully shown and described, whereby the seed may be sown in greater or less quantity over a given area, as may be required, and the work performed in a superior manner and with very little labor or manipulation on the part of driver or operator.

A represents a rectangular frame, which is mounted on two wheels, B B, and has a seed box or hopper, C, fitted or secured upon it and extending its whole length.

D D represent two shafts, which are in line with each other and have their bearings in the frame A, said shafts being underneath the seed box or hopper, and each having a series of wheels, E, upon it, which are provided with recesses, $a$, to receive the seed. These wheels E may be described as being composed of hubs $b$, having radial arms $c$ and a flat rim, $d$, notched to form the orifices of the recesses $a$. These wheels at one side are entirely open, and they have openings at the opposite side. The wheels are keyed upon the shafts D D in rather oblique positions, so as to rotate in what is commonly termed a "drunken" manner. These shafts project through the supports of the seed-box C, and have each a pinion, F, on them, into which toothed wheels G gear.

The wheels G are placed loosely on the arms $e$ of the wheels B B, and each toothed wheel G has two holes, $f\,f$, in it to receive two pins, $g\,g$, which project from the inner ends of the hubs $h\,h$ of the wheels B B. By this means the toothed wheels G are connected to the wheels B B, on which the machine is mounted. In Figs. 5 and 6 the pins $g\,g$ of the hub of one of the wheels B and the holes $f\,f$ in a toothed wheel, G, are clearly shown, and in Fig. 1 the connection of the wheels G to the hubs is shown.

The bottom of the seed-box C has a series of metal plates, H, attached to it, said plates being directly over the wheels E, and of concave form at their under sides, with a hole, $i$, at the center, said holes passing entirely through the plates. (See Fig. 3.)

I is a slide, which is at the bottom of the seed-box, and is perforated with holes $j$. This slide works over the plates H, and it is moved or adjusted by a lever, J, the lower end of which is connected to one end of the slide I by a joint or pivot, $k$. This lever passes up through a box, K, within the seed-box, at one end of it, said box K being of taper form, and of such a size at its upper end as just to allow the lever J to pass through it. (See Fig. 1.) This box K serves as a fulcrum for lever J and admits of the lower end of the latter being attached directly to the slide I, as the lever is allowed to slide in box K. If the lever J were fitted on a fulcrum-pin, the lower end of the former would require to be connected to the slide I by a link.

Directly over the slide I there are secured a series of plates, L, which are in line with or directly above the spaces between the plates H, as shown in Fig. 1.

The lever J passes up through an oblong slot, $l$, in a metal plate, M, which is secured to the top of the seed box or hopper C. This plate M is secured to the top of the seed box or hopper by screws $m$, which pass through oblong slots $n\,n$ in the plate and into the top of the seed-box. By this means it will be seen that the throw of the lever J may be regulated as desired, in order to adjust the plate I so that its holes $j$ may be made to register or coincide with the holes $i$ of the plates H more or less fully or in a greater or less degree, according to the quantity of seed to be sown on a given area.

N N N represent three V-shaped harrows, the front ends of which are connected by chains O with the front part of the frame A. The rear ends of these harrows are connected by joints n, as shown clearly in Fig. 2. The chains O are sufficiently long to admit of the harrows N being at such a distance behind the machine as to cover the seed properly.

The operation is as follows: The plate M is first adjusted to admit of the lever J, when thrown or moved to the right, to move the slide I so that its holes j will have a proper relative position with the holes i in the plates H to sow the required quantity of seed over a given area of ground. The lever J is then moved to the left, which causes the holes j in I to be out of line or register with the holes i in the plates H, and the seed box or hopper is supplied with seed; and on starting the machine the driver turns the lever J to the right and the seed passes through the openings or holes j i into the recesses a of the wheels E, the latter distributing or scattering the seed upon the earth and the harrows N covering the seed.

The oblique position of the wheels E causes the seed to be distributed or scattered much more thoroughly than it otherwise would be, while the two shafts D D, with a wheel B attached to each, admit of the machine being drawn along easily, each wheel rotating with a speed commensurate with the space of ground it passes over, and thereby insuring a uniform distribution of the seed. This is an important feature, especially when the machine is turning at the ends of a field or passing in a curved or winding direction.

In consequence of having the harrows arranged as shown they are allowed to conform perfectly to the inequalities of surface over which they may pass.

I claim as new and desire to secure by Letters Patent—

1. The employment or use, in a seeding-machine, of two shafts, D D, provided with oblique seed-distributing wheels E, and having the wheels B on which the machine is mounted secured to them, substantially as and for the purpose herein set forth.

2. The peculiar form or construction of the seed-distributing wheels E, substantially as herein specified.

HENRY WILLIAMS.

Witnesses:
SILAS AMES,
D. CROSIT.